United States Patent [19]
Aksoy et al.

[11] Patent Number: 5,314,763
[45] Date of Patent: May 24, 1994

[54] BATTERY LATCH

[75] Inventors: Adnan Aksoy, Boca Raton; Micheal M. Austin, Pompano Beach; Russell E. Gyenes, Sunrise, all of Fla.

[73] Assignee: Motorola, Inc., Schaumburg, Ill.

[21] Appl. No.: 95,074

[22] Filed: Jul. 20, 1993

[51] Int. Cl.$^5$ .............................................. H01M 2/10
[52] U.S. Cl. ........................................ 429/97; 429/98; 429/123; 361/725; 361/814; 455/348
[58] Field of Search .................................. 429/96–100, 429/123; 455/90, 127, 347, 128, 349, 348; 206/333; 361/380, 394, 391, 422

[56] References Cited

U.S. PATENT DOCUMENTS

| | | | |
|---|---|---|---|
| 4,904,549 | 2/1990 | Goodwin et al. | 429/97 |
| 5,203,022 | 4/1993 | Finch et al. | 455/127 |
| 5,244,755 | 9/1993 | Benoist et al. | 429/97 |

Primary Examiner—Anthony Skapars
Attorney, Agent, or Firm—Lesley Ann Rhyne

[57] ABSTRACT

A removable battery package (10) having a latch mechanism (32) for attaching the battery package (10) to a radio (18) is provided. The battery package (10) comprises a housing (15) having an interior surface (30), an exterior surface (14) and sidewalls (16). Engagement means (32) are located on the interior surface (30) of the housing (15) for engaging a receiving means (22) located on the radio (18). Activating means are provided for activating the latch wherein the activating means comprises a recessed portion (12) located in the exterior surface (14) of the housing (15) transverse to the engagement means(32). The recessed portion (12) is designed so that by pressing the sidewalls (16) of the housing (15) a portion of the housing (24) is temporarily outwardly deformed thereby disengaging the engagement means (32).

8 Claims, 2 Drawing Sheets

BATTERY LATCH

TECHNICAL FIELD

This invention relates generally to latch devices and more specifically to latch devices for removable battery packages for communication devices.

BACKGROUND

In wireless communication devices, especially two-way radios and telephones, the devices must have some type of a power supply. A typical power supply for such devices is a removable battery package. Most battery packages have latching systems to facilitate removing the battery packages from the communications device. Existing latching systems incorporate a finger push latch offset from an engagement member at a specific distance. Engagement occurs when the user slides the battery package on the radio. During sliding an attachment member is twisted by the latch internally interfering with the radio receiving means and when the final position is reached, the latch engages into the radio receiving means. Disengagement is produced when a user pushes on the latch, putting the attachment member in torsion, which rotates the engagement feature up out of the radio receiving means at which point the user slides the battery package off the radio.

The force applied by the user to disengage this latch causes a deflection in the battery housings of light weight battery packages. This deflection in the direction of the force causes the latch to engage more and makes it harder to disengage the latch. As battery housings get thinner, which is currently proposed for future products, this problem will be extreme.

Problems also occur in existing latches because of the weak attachment member. When the radio and battery are subject to a large enough force the battery should detach without breaking the latch, instead what occurs with existing latches is that they engage more and the attachment member is broken because the latch did not release. Thus, there exists a need for an improved latch mechanism for thin light weight battery packages.

SUMMARY OF THE INVENTION

Briefly, according to the invention, a removable battery package having a latch mechanism for attaching the battery package to a radio, the battery package comprising a housing having an interior surface, an exterior surface and sidewalls. Engagement means are located on the interior surface of the housing for engaging a receiving means located on the radio. Activating means are provided for activating the latch wherein the activating means comprises a recessed portion located in the exterior surface of the housing transverse to the engagement means. The recessed portion is designed so that by pressing the sidewalls of the housing a portion of the housing is temporarily outwardly deformed thereby disengaging the engagement means.

DETAILED DESCRIPTION OF THE PREFERRED EMBODIMENT

Figure 1:
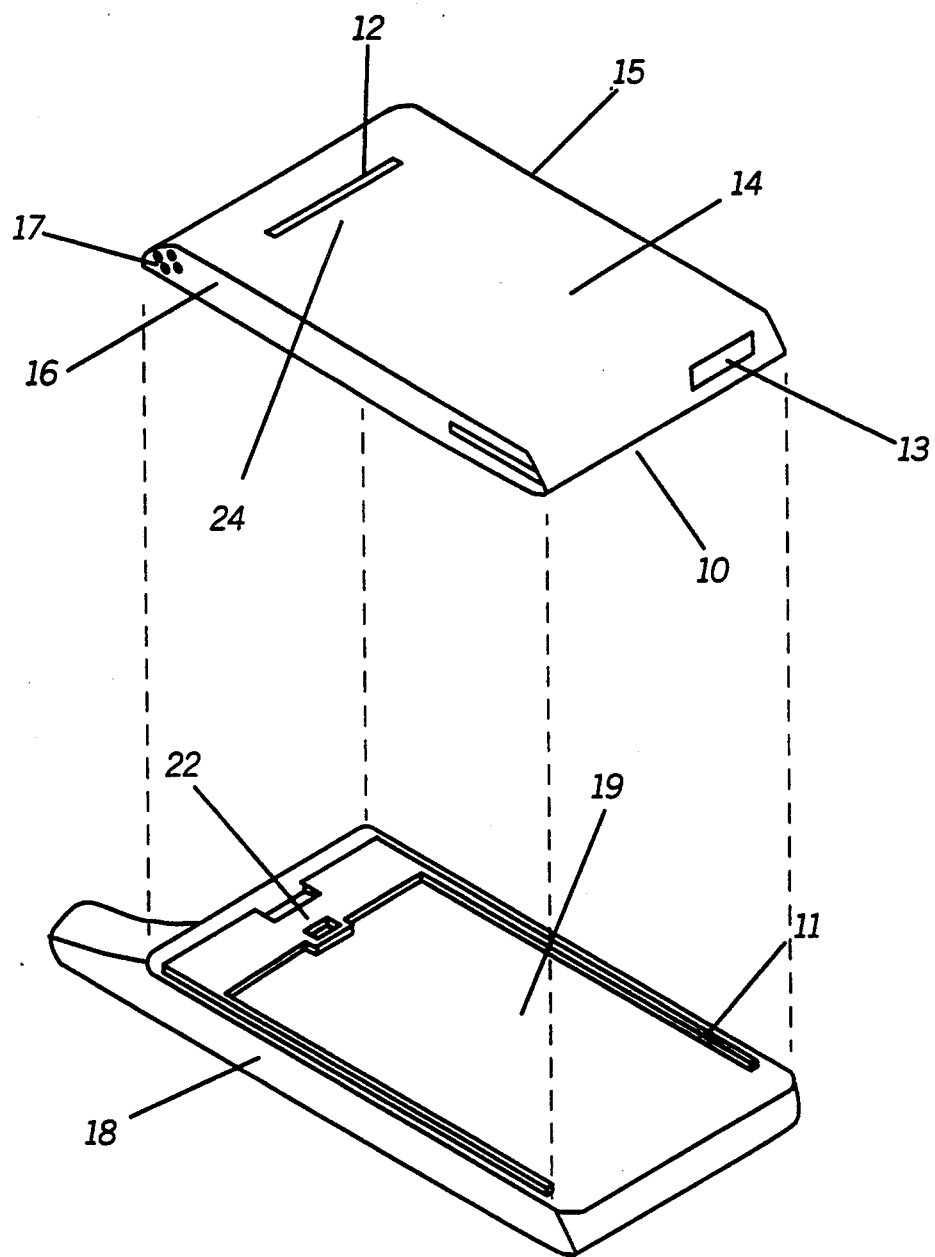
FIG. 1 is an exploded view of a battery package and radio according to the present invention.

While the specification concludes with claims defining the features of the invention that are regarded as novel, it is believed that the invention will be better understood from a consideration of the following description in conjunction with the drawing figures, in which like reference numerals are carried forward.

FIG. 1 is an exploded view of a battery package 10 and radio 18 according to the present invention. The battery package 10 includes a housing 15 having an exterior surface 14 and two sidewalls, one of which is shown 16. An aperture 12 is shown in the exterior surface of the battery package housing 15. The aperture 12 can be of any shape, i.e., including a smiley face, as long as the aperture 12 facilitates outwardly deforming a portion 24 of the housing 15 when the sidewalls 16 are pressed. Dimples 17 may be provided for locating the proper area of the sidewalls 16 that need to be pressed or squeezed towards each other by a user. An opening may be provided in the exterior surface 14 of the housing 15 for charger contacts.

FIG. 1 also shows a back of a radio 19 where the battery package 10 is attachable. The back of the radio 19 has guides 11 along each side for guiding the radio package 10 onto the back of the radio 19. The back of the radio 19 also has a receiving means 22 for receiving an engagement means 32 of the battery package 10 (shown in FIG. 2). The receiving means is shown as a notch 22.

Figure 2:
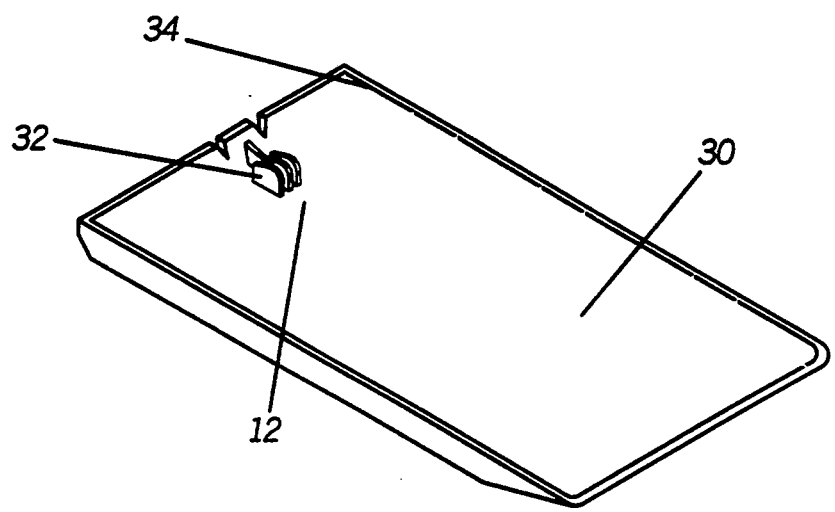
FIG. 2 is a perspective view of the interior surface of the housing of a battery package according to the present invention.

FIG. 2 shows an interior surface 30 of the battery package 10. The interior surface 30 includes the engagement means 32 for engaging the receiving means 22 on the back of the radio body 19. The engagement means comprises of three ribbed extensions 32 including two end extensions which are shorter than a middle extension. Although the engagement means is shown as three ribbed extensions 32 including two end extensions which are shorter than a middle extension, any number of extensions or different sizes and shapes of extensions would suffice as long as the extensions had means for engaging the receiving means 22 on the back of the radio 19. The recessed portion 12 may be an aperture through the exterior 14 and the interior surface 30 of the radio package 10. The sidewalls of the battery package are thinned in the area 34 where they will be pressed or squeezed.

Figure 3:
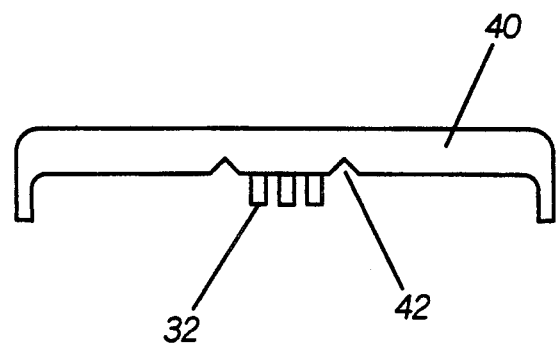
FIG. 3 is a top view of a battery package according to the present invention.

FIG. 3 shows a top view of the battery package 10. A top portion 40 of the battery package 10 is shown including v-shaped grooves 42 for causing the housing 15 to buckle or outwardly deform when the sidewalls 16 are pressed. The v-shaped grooves 42, the area of the sidewalls 16 that are pressed or squeezed together, and the aperture 12 control the direction of buckling or outward deformation of the housing for proper disengagement.

In use, when the user squeezes the sidewalls 16 of the battery housing 15, force causes the housing to outwardly deform or buckle at the grooves 42 along the aperture 12. The amount of buckling may be controlled by the thickness of the thinned walls 34 while the grooves 42 control the direction of buckling. Engagement occurs when the user slides the battery package 10 along the guides 11 onto the back of the radio 19. During sliding, a portion of the battery package housing 24 is forced up by the engagement means or three ribbed extensions 32 by the receiving means 22 on the back of the radio 19. The ribbed extensions 32 are snapped over the notch or receiving means 22. When the final position is reached, the notch 22 engages the ribbed extensions 32. Disengagement is produced when a user squeezes the sidewalls 16 of the battery package housing 15 causing a portion of the housing 24 to temporarily outwardly deform and pulling the latch 32 up above the receiving means 22, thus, disengaging, so the user can slide the battery package 10 off the radio 18.

The squeeze latch design of the present invention is a lower profile battery package 10 to radio 18 latching means that achieves strength improvements in the battery housing 15 by increasing the size of the plastic attachment member 24. The present invention also changes the direction of force required for disengagement so that the force is perpendicular to the engagement/disengagement directions solving thin plastic deflection problems. The squeeze latch design increases an engagement factor of the latch 32 in the receiving means 22 by allowing a greater deflection of the attachment member 24 when engaging and disengaging. This larger deflection can be achieved by the user easier because more force can be applied through squeezing then by a finger push activation. When the user squeezes the sidewalls 16 of the battery housing 15, the forces cause the attachment member 24 to buckle temporarily outward at the grooves 42 along the aperture 12. This buckling at the attachment member 24 pulls the latch 32 up out of the radio receiving means 22 for disengagement. Because of the natural way a user holds the battery package 10 while activating the latch, it is not necessary to re-adjust finger positioning to slide the battery package 10 off the radio 18 guides 11. The user just squeezes then pulls down with the same grip used to squeeze. Thus, an improved latch mechanism for a battery package is provided that is stronger and easier to use.

While the invention has been particularly shown and described with reference to several preferred embodiments thereof, it will be understood by those skilled in the art that various changes in form and detail may be made without departing from the spirit or scope of the invention

What is claimed is:

1. A removable battery package having a latch mechanism for attaching the battery package to a radio, the battery package comprising:
    a housing having an interior surface, an exterior surface and sidewalls;
    engagement means located on the interior surface of the housing for engaging a receiving means located on the radio;
    activating means for activating the latch wherein
        the activating means comprises a recessed portion located in the exterior surface of the housing transverse to the engagement means,
        the recessed portion is designed so that by pressing the sidewalls of the housing a portion of the housing is temporarily outwardly deformed thereby disengaging the engagement means.

2. The removable battery package of claim 1 wherein the recessed portion comprises an aperture through both the exterior surface and the interior surface of the housing.

3. The removable battery package of claim 1 wherein a portion of the sidewalls that are pressed to disengage the engagement feature are thinner than a remaining portion of the sidewall of the housing.

4. The removable battery package of claim 1 further comprising a top portion having grooves that facilitate the outwardly deforming of the housing when the sidewalls are pressed.

5. The removable battery package of claim 1 wherein the recessed portion comprises a curved line.

6. A removable battery package having a latch mechanism for attaching the battery package to a radio, the battery package comprising;
    a housing having an exterior surface, an interior surface, a top portion and sidewalls;
    engagement means located on the interior surface of the housing for engaging a receiving means located on the radio;
    activating means for activating the latch wherein the activating means comprises an aperture through the exterior surface and the interior surface of the housing and transversing the engagement means so that when the sidewalls are pressed a portion of the housing is outwardly deformed thereby disengaging the engagement feature;
    grooves in the top portion that facilitate the outwardly deforming of the housing when the sidewalls are pressed.

7. The removable battery package of claim 6 wherein the sidewalls that are pressed to disengage the engagement feature are thinner than a remaining portion of the sidewall of the housing.

8. The removable battery package of claim 6 wherein the aperture comprises a curved line.

* * * * *